United States Patent [19]

Ikematu et al.

[11] Patent Number: 5,189,110

[45] Date of Patent: Feb. 23, 1993

[54] SHAPE MEMORY POLYMER RESIN, COMPOSITION AND THE SHAPE MEMORIZING MOLDED PRODUCT THEREOF

[75] Inventors: Takeshi Ikematu, Musashino; Yasushi Kishimoto; Koichi Miyamoto, both of Kawasaki, all of Japan

[73] Assignee: Asahi Kasei Kogyo Kabushiki Kaisha, Osaka, Japan

[21] Appl. No.: 759,618

[22] Filed: Sep. 16, 1991

Related U.S. Application Data

[63] Continuation of Ser. No. 454,264, Dec. 21, 1989, abandoned.

[30] Foreign Application Priority Data

Dec. 23, 1988 [JP] Japan .................. 63-323267
Nov. 2, 1989 [JP] Japan .................. 1-284700

[51] Int. Cl.$^5$ .................... C08F 297/04; C08L 53/02; B29C 61/06
[52] U.S. Cl. ........................ 525/314; 525/93; 525/98; 525/99; 525/153; 525/250; 525/271; 525/940; 525/420; 525/437; 525/453; 264/230
[58] Field of Search ............... 525/314, 153, 271, 250, 525/940

[56] References Cited

U.S. PATENT DOCUMENTS

| | | |
|---|---|---|
| Re. 27,145 | 6/1971 | Jones . |
| 3,265,765 | 8/1966 | Holden et al. . |
| 3,431,323 | 3/1969 | Jones . |
| 4,010,226 | 3/1977 | Crossland . |
| 4,051,217 | 9/1977 | Lundberg . |
| 4,172,826 | 10/1979 | Haaf et al. ............ 525/99 |
| 4,322,507 | 3/1982 | Haaf . |
| 4,628,072 | 12/1986 | Shiraki et al. ......... 525/96 |

FOREIGN PATENT DOCUMENTS

| | | |
|---|---|---|
| 0234512 | 2/1987 | European Pat. Off. . |
| 56-118403 | 9/1981 | Japan . |
| 60-079061 | 5/1985 | Japan . |
| 63-179955 | 7/1988 | Japan . |
| 63-179956 | 7/1988 | Japan . |
| 8603980 | 7/1986 | PCT Int'l Appl. . |
| 8301254 | 4/1983 | World Int. Prop. O. . |

*Primary Examiner*—James J. Seidleck
*Assistant Examiner*—Vasu S. Jagannathan
*Attorney, Agent, or Firm*—Birch, Stewart, Kolasch & Birch

[57] ABSTRACT

A shape memory polymer resin, consisting essentially of a block copolymer having an A-B-A block structure in the polymer chain, and having a weight average molecular weight within the range of 10,000 to 1,000,000, wherein (a) block A is a polymer block comprising a homopolymer or a copolymer of a vinyl aromatic compound and/or a hydrogenated product thereof;
(b) block B is a polymer block comprising a homopolymer or a copolymer of butadiene and/or a hydrogenated product thereof, the content of butadiene and/or the hydrogenated product thereof in block B being at least 80% by weight, and 80 to 91% of the linkages of the butadiene and/or the hydrogenated product thereof being 1,4-linkages;
(c) at least 80% by weight of the conjugated diene in the block copolymer being hydrogenated; and
(d) the block copolymer comprises 5 to 50% by weight of said block A; and a shape memory resin composition and a shape memorizing molded product thereof.

The product of the present invention can be used for toys, bonding materials for singular pipes, internal laminating materials of pipes, lining materials, clamping pins, medical instrument materials such as gyps, etc., stationery and educational materials, artificial flower, doll, internal laminates of rolls of dot printer for computer, sound-proofing materials, members requiring deformation restoration after impact absorption such as automobile bumper, etc., gap preventing materials of partitioning members for house, portable vessel which is folded during nonuse and restored in shape during use, mechanical device such as coupling, etc., various heat shrinkable tubes, etc.

13 Claims, 2 Drawing Sheets

SHAPE MEMORY POLYMER RESIN, COMPOSITION AND THE SHAPE MEMORIZING MOLDED PRODUCT THEREOF

This application is a continuation of application Ser. No. 07/454,264 filed on Dec. 21, 1989, abandoned, the entire contents of which are incorporated herein by reference.

TECHNICAL FIELD

The present invention relates to a heat-sensitive shape memory polymer resin, a resin composition and a shape memorizing molded product excellent in shape memorizing characteristics. More particularly, it relates to a shape memory polymer resin, a resin composition and a shape memorizing molded product, which exhibit excellent shape memorizing characteristics by performing molding according to a conventional processing method used for plastics and then deforming the molded product in a specific temperature range and cooling it, thereby fixing its strain.

BACKGROUND ART

As the material having shape memorizing characteristics, shape memorizing alloys have been already known. Examples of this type may include Cu—Al—Ni alloys, Au—Cd alloys, In—Ti alloys, Ni—Ti alloys, etc. Although these shape memorizing alloys have shape memorizing characteristics with excellent heat-sensitivity, they have not yet been widely used except for special uses, because their base material is very expensive or the heat treatment or processing thereof for exhibiting shape memorizing characteristics is not necessarily easy.

On the other hand, several types of polymers have been already known as polymers having heat-sensitive shape memorizing performance These can be classified by structure into, crosslinked products of polymers having an adequate melting point or a glass transition temperature exceeding normal temperature or cold processed products of polymers having an adequate melting point or a glass transition temperature exceeding normal temperature and having a remarkably high molecular weight.

Generally, in a temperature range of not higher than the glass transition temperature or the melting point, a polymeric material shows restricted thermal motion of its molecular chains and exhibits properties as a rigid resin. However, when it is heated to not lower than the glass transition temperature or the melting point, it becomes a so-called rubbery substance. This type of temperature dependency is common in all of the polymeric materials. Although there are many aspects to be considered such as the temperature range wherein a glass transition temperature or a melting point exists, the readiness in plastic deformation, etc., most polymeric materials having some substantial crosslinking points to the extent that the strain is not relaxed, have shape memorizing properties to some extent.

More specifically, a molded resin product of a certain type of polymer is prepared by various molding methods, and after molding, a crosslinking reaction is carried out for memorizing the shape. When the molded product is elevated to a temperature not lower than its glass transition temperature or melting point, at which deformation occurs, and then is lowered to a temperature which is not higher than the glass transition temperature or the melting point in the state at which deformation has occurred, its strain is maintained. This is because the thermal motion of molecular chains is restricted at a temperature not higher than the glass transition temperature or melting point, whereby the strain is fixed. When the deformed molded product is again heated to a temperature not lower than the glass transition temperature or melting point wherein the thermal motion of molecular chains is possible, the strain is released to restore its original shape.

As such a shape memorizing resin, a crosslinked product of a crystalline polyolefin (U.S. Pat. No. 3,086,242), a crosslinked product of crystalline trans-polyisoprene (Japanese Unexamined Patent Publication No. 16956/1986), a crosslinked product of crystalline trans-polybutadiene (U.S. Pat. No. 3,139,468), etc. have been known. Among polyolefins, particularly a crosslinked product of crystalline polyethylene has been practically applied for uses such as heat shrinkable tube, etc. However, in these crystalline polymers, in order to prevent the inhibition of crystallization by crosslinking, an operation for exhibiting shape memorizing characteristics is required such that the crosslinking is required to be effected by vulcanization at a low temperature or irradiation of radiation in the state in which the polymer is crystallized, etc. Therefore, these types of shape memorizing resins have not yet been widely used except for specific uses.

Further, when the polymer has a remarkably high molecular weight, even at a temperature not lower than the glass transition temperature, the entanglement of the polymer molecular chains becomes substantially the cross-linking points and hence the strain is not relaxed, whereby the polymer exhibits shape memorizing function. As examples of these types of shape memorizable resins, polynorbornene (U.S. Pat. No. 4,831,094), polyvinyl chloride, polymethyl methacrylate, polycarbonate, acrylonitrile-butadiene resin, etc., are known.

However, to ensure that this type of polymer exhibits a sufficient shape memorizing function, the molecular weight must be made remarkably high (e.g. 2,000,000 or higher), and in this case, flowability of the polymer will be necessarily lowered to a great extent which renders processing by a general purpose plastic processing machine such as injection molding, extrusion molding, etc. extremely difficult. Also, there is a technique, in which the molecular weight is set at a slightly lower level than described above and cold processing is effected, by deforming at a temperature not higher than the glass transition temperature, but this technique requires special operations which make the processing production steps complicated, having difficult problems such as insufficient restoration performance, etc. Therefore, it has not been widely used either.

As a new technical principle to improve the problems in processability which are inherent in the prior art of using these polymers, a shape memory resin utilizing a block copolymer has also been already developed. Examples of this technique include the technique of using a fluorine resin type block copolymer (Japanese Unexamined Patent Publication No. 227437/1984), the technique of using a polyester, a polyether or a polyurethane type block copolymer (International Publication No. WO 86/03980) and the technique of using a crystalline styrene-butadiene type block copolymer (European Patent Publication No. 0234512).

These types of techniques, while generally having accomplished improved processability, still have respective remaining problems. In the technique of using the fluorine resin type block copolymer as described above, although it having specific features in flame retardancy, heat aging resistance of the molded product obtained, for exhibiting sufficiently shape memorizing performance, a crosslinking by electron beam irradiation is required, and it still has a problem in processing production steps. On the other hand, the technique of using a polyester, a polyether or a polyurethane type block copolymer as described above is inferior in heat resistant stability, weathering resistance as performances of the base material to be used for industrial uses. Further, the technique of employing the above-described crystalline styrene-butadiene type block copolymer provides a material having sufficient processability by means of a general purpose plastic processing machine, which has accomplished excellent shape memorizing performance. However, since this polymer contains many unsaturated bonds in the polymer chain, when industrial uses are considered, problems remain with respect to heat resistant stability and weathering resistance.

On the other hand, hydrogenated products of styrene-butadiene block copolymers have been already known. This type of polymer is a hydrogenated product containing generally 35 to 55% of 1,2-linkage in the butadiene linkage chains, and has excellent performances as noncrystalline thermolastic elastomer (U.S. Pat. No. 3,431,323). However, neither performance nor utilization of this kind of base material as a shape memorizing resin have yet been known in the prior art.

The present invention intends to solve the various drawbacks described above as observed in the shape memory materials of the prior art, namely the problem of cumbersome handling as a result of an application of general purpose plastic processing method such as injection molding, extrusion molding, etc. being generally difficult and a special operation, being required such as a crosslinking reaction at a low temperature.

As a result, the present invention provides a shape memory polymer resin, a resin composition and a shape memorizing molded product, which are also excellent in performance as the resin material such as not only heat resistance and weathering resistance, but also in strength, etc.

The present inventors have investigated intensively in order to develop a shape memorizable resin and a resin composition which solve these problems of the prior art, and consequently have found that a molded product obtained by molding a copolymer resin having a specific structure or a resin composition containing the same copolymer resin as the component by a generally used molding machine of plastics such as an injection molding or extrusion molding machine and then remolding it to a form different from the molded shape in the specified condition, has extremely excellent shape memorizing performance without requiring any special operation for imparting a shape such as crosslinking reaction, etc., and as a result, have accomplished the present invention.

DISCLOSURE

Figure 1:
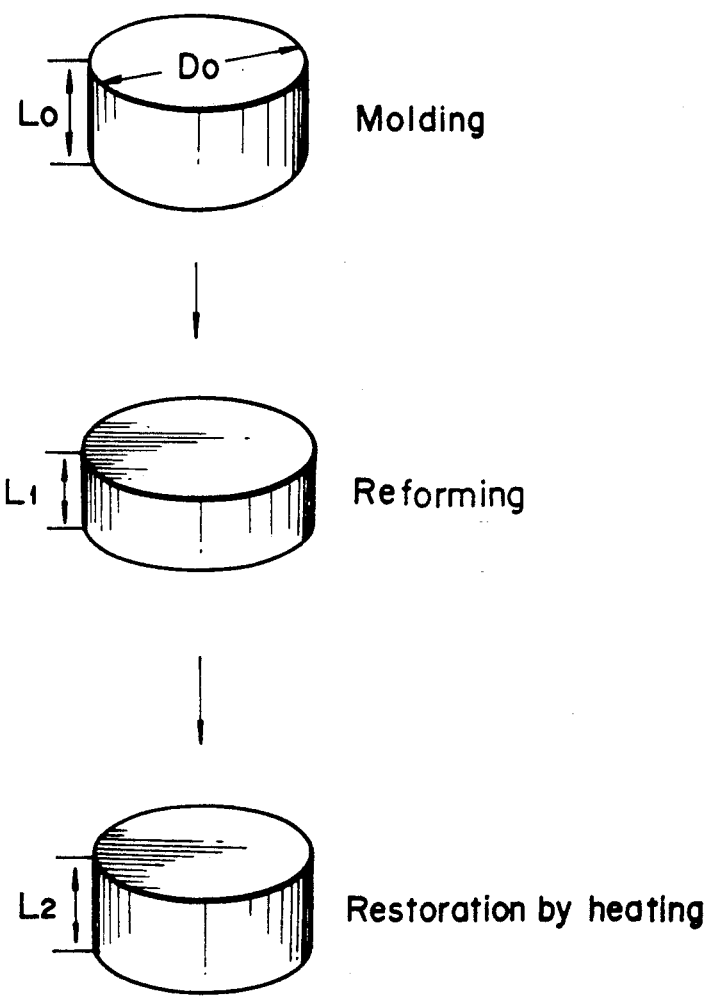
FIG. 1 schematically illustrates the steps for the evaluation of the shape memorizing performance.

More specifically, the present invention relates to a shape memory polymer resin, a resin composition, a shape memorizing molded product and a method for the use thereof as described below.

1. A shape memory polymer resin, consisting essentially of a block copolymer having an A-B-A block structure in the polymer chain, and having a weight average molecular weight within the range of 10,000 to 1,000,000, wherein (a) block A is a polymer block comprising a homopolymer of a vinyl aromatic compound, a copolymer of a vinyl aromatic compound and another vinyl aromatic compound, a copolymer of a vinyl aromatic compound and a conjugated diene compound, and/or a hydrogenated product thereof;

(b) block B is a polymer block comprising a homopolymer of butadiene, a copolymer of butadiene with another conjugated diene compound, a copolymer of butadiene with a vinyl aromatic compound, and/or a hydrogenated product thereof, the content of butadiene and/or the hydrogenated product thereof in block B being at least 80% by weight, and 80 to 91% of the linkages of the butadiene and/or the hydrogenated product thereof being 1,4-linkages;

(c) at least 80% by weight of the conjugated diene in the block copolymer being hydrogenated; and (d) the block copolymer comprises 5 to 50% by weight of said block A; and wherein said polymer resin having the following properties (1) to (3):

(1) the glass transition temperature Ta of the phase containing block A and the crystalline melting point Tb of the phase containing block B, having the relationship shown by the following formula:

$$25° C. \leq Tb < Ta \leq 150° C.,$$

(2) the crystallinity of the phase containing block B at 25° C. being at least 5% by weight; and (3) said polymer resin being compressible by at least ½-fold of the original thickness at a temperature of $(Ta+Tb)/2$, and at least 70% of the deformation being nonelastically fixed by cooling the compressed product to 25° C., and at least 90% of said deformation fixed being restored by reheating to a temperature exceeding $(Ta+Tb)/2$.

2. A shape memory polymer resin composition consisting essentially of, (I) 100 parts by weight of a shape memorizable polymer resin component consisting essentially of a block copolymer having an A-B-A block structure in the polymer chain, and having a weight average molecular weight within the range of 10,000 to 1,000,000, wherein (a) block A is a polymer block comprising a homopolymer of a vinyl aromatic compound, a copolymer of a vinyl aromatic compound and another vinyl aromatic compound, a copolymer of a vinyl aromatic compound and a conjugated diene compound, and/or a hydrogenated product thereof;

(b) block B is a polymer block comprising a homopolymer of butadiene, a copolymer of butadiene with another conjugated diene compound, a copolymer of butadiene with a vinyl aromatic compound, and/or a hydrogenated product thereof, the content of butadiene and/or the hydrogenated product thereof in block B being at least 80% by weight, and 80 to 91% of the linkages of the butadiene and/or the hydrogenated product thereof being 1,4-linkages;

(c) at least 80% by weight of the conjugated diene in the block copolymer being hydrogenated; and (d) the block copolymer comprises 5 to 50% by weight of said block A; and (II) 0.1 to 400 parts by weight of at least one polymer component miscible with at least one of block A and block B of said polymer resin component (I), wherein said polymer resin composition having the following properties (1) to (3):

(1) the glass transition temperature Ta' of the phase containing block A and the crystalline melting point Tb' the phase containing block B, having the relationship shown by the following formula:

$$25° C. \leq Tb' < Ta' \leq 150° C.,$$

(2) the crystallinity of the phase containing block B at 25° C. being at least 5% by weight; and (3) said polymer resin composition being compressible by at least ¼-fold of the original thickness at a temperature of (Ta'+Tb')/2, and at least 70% of the deformation being nonelastically fixed by cooling the compressed product to 25° C., and at least 90% of said deformation fixed being restored by reheating to a temperature exceeding (Ta'+Tb')/2.

3. A shape memorizing molded product, wherein a reformed shape is fixed, said reformed shape having been formed by molding the above-described shape memory polymer resin or resin composition into a desired shape at a temperature exceeding Ta or Ta', subsequently reforming into a shape different from said molded shape at a temperature not higher than Ta or Ta', and cooling the reformed product to a temperature not higher than Tb or Tb'.

4. A method for restoring a shape memorizing molded product to the original molded shape, which comprises heating a shape memorizing molded product to a temperature not lower than Tb or Tb' and lower than the molding temperature, thereby restoring the shape memorizing molded product to the original molded shape.

Specific examples of the block copolymer structure which can be used in the present invention may include a linear type block structure, a radial type block structure or a graft type block structure represented by the formulae:

(a) $(A-B)_n A$
(b) $B(A-B)_n A$
(c) $B(A-B)_n A-B$
(d) $[(A-B)_n]_m X$
(e) $[(A-B)_n A]_m X$
(f) $[B(A-B)_n]_m X$
(g) $[B(A-B)_n A]_m X$ (h)

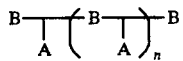

In the above formulae, n is an integer of 1 to 10, preferably 1 to 5, m is an integer of 2 to 10, preferably 2 to 4. The block copolymer used in the present invention may also be a mixture of polymers having different n and m. X is a terminal coupling agent, and each of block A and each of block B may be of the same structure or different structures respectively. Block A comprises a homopolymer of a vinyl aromatic compound, a copolymer of a vinyl aromatic compound with another vinyl aromatic compound, a copolymer of a vinyl aromatic compound and a conjugated diene compound, and/or a hydrogenated product thereof. When block A is a copolymer, its copolymer mode may be any selected from random copolymers, alternate copolymers, tapered copolymers, etc., and is not particularly limited. Particularly, when block A is a copolymer of a vinyl aromatic compound and a conjugated diene compound and/or a hydrogenated product thereof, the preferable content of the vinyl aromatic compound or its hydrogenated product may be at least 70% by weight, particularly at least 95% by weight. If the above content is less than 70% by weight, the phase separation structure of blocks A and B of the block copolymer breaks down, whereby the shape memorizing performance of the copolymer is undesirably lowered.

The preferable range of the weight average molecular weight of block A is from 1,000 to 100,000, more preferably from 3,000 to 30,000. Excessively high molecular weight will increase the molecular weight of the resultant block copolymer obtained, and hence make the melt viscosity of the polymer resin or the resin composition high, whereby processability is lowered. On the other hand, excessively low molecular weight results in an insufficient shape memorizing performance of the polymer resin or the resin composition obtained, probably because of breaking down of the phase separation structure of blocks A and B of the block copolymer.

Block B comprises a hydrogenated product of a polymer selected from homopolymers of 1,3-butadiene, copolymers of 1,3-butadiene and another conjugated diene compound, and copolymers of 1,3-butadiene and a vinyl aromatic compound. When block B is a copolymer, its bonding mode may be any copolymerization mode of random copolymerization, tapered copolymerization, etc., and is not particularly limitative. However, the content of the bonding units based on butadiene (butadiene units and hydrogenated units thereof) in block B should be at least 80% by weight, preferably 95% by weight. If the content of the bonding units based on butadiene is less than 80% by weight, the crystallinity of block B is lowered to a great extent, leading undesirably to lowering in shape memorizing performance of the polymer resin or the resin composition. Also, 80 to 91%, preferably 83 to 90% of the bonding mode of the bonding units based on butadiene must be 1,4-linkages. If 1,4-linkages are less than 80%, the shape memorizing performance will be lowered, while if they exceed 91%, moldability or shape memorizing performance will be undesirably lowered. Further, at least 80 mole % of the conjugated diene units are hydrogenated product, preferably 90 mole % or more, more preferably 95 mole % or more, particularly 98 mole % or more. If the hydrogenation ratio is less than 80 mole %, no sufficient crystallinity can be imparted to the block copolymer obtained, and also no sufficient shape memorizing performance can be exhibited. On the contrary, if the hydrogenation ratio is 98 mole % or more, it is particularly preferable because heat resistance and weathering resistance of the molded product obtained are remarkably improved.

Preferable range of the weight average molecular weight of block B is from 2,000 to 500,000, more preferably from 10,000 to 100,000. Excessively high molecular weight makes higher the molecular weight of the resultant block copolymer obtained, and hence the melt viscosity of the polymer resin or the resin composition, whereby processability of the resin or the resin composition is lowered. On the other hand, an excessively low molecular weight results in a lowering in the shape memorizing performance of the polymer resin obtained, probably because of breaking down of the phase separation structure of blocks A and B of the block copolymer The weight average molecular weight of the block copolymer or the copolymer component as a whole must be within the range from 10,000 to 1,000,000. Preferably weight average molecular weight is from 15,000 to 300,000, particularly from 20,000 to 150,000. Excessively high molecular weight makes the melt viscosity higher whereby processability of the resin or the resin composition is lowered. On the other hand, excessively low molecular weight will lower undesirably properties of the resin such as strength, rigidity, etc. Concerning the compositional ratio of blocks A and B, the content of block A, may be within the range of 5 to 50% by weight, preferably 10 to 50% by weight, more preferably 20 to 40% by weight. Outside this range of the compositional ratio of blocks A and B, shape memorizing performance cannot be sufficiently exhibited.

The block copolymer used in the shape memory polymer resin or the resin composition of the present invention can be obtained by application of known techniques. For example, they can be obtained by polymerizing successively monomers or mixtures thereof selected from a vinyl aromatic compound and a conjugated diene compound by anionic polymerization, etc., according to the methods as disclosed in Japanese Examined Patent Publications Nos. 23798/1965, 24914/1965 or 3990/1971, etc., subjecting the copolymer obtained to various polymer reactions, if necessary, and then effecting hydrogenation reaction onto the unsaturated bonds according to the methods as shown in, for example, U.S. Pat. Nos. 4,427,834 or 4,501,857.

Examples of a preferable vinyl aromatic compound used in preparing these block copolymers may include styrene, α-methylstyrene, p-methylstyrene, m-methylstyrene, o-methylstyrene, p-tert-butylstyrene, dimethylstyrene, vinylnaphthalene, diphenylethylene. Examples of a preferable conjugated diene compound other than butadiene used may include isoprene, 2,3-dimethyl-1,3-butadiene, 2,4-hexadiene. A particularly preferable vinyl aromatic compound is styrene.

Further, in the polymer resin of the present invention, the phase containing primarily the block A of the block copolymer and the phase containing primarily the block B are non-compatible with each other, and the glass transition temperature $T_a$ of the phase containing primarily the block A and the crystalline melting point $T_b$ of the phase containing primarily the block B must have the relationship of the following formula.

$$25° C. \leq T_b < T_a \leq 150° C.$$

Preferably, the relationship should be $40° C. \leq T_b < T_a \leq 130° C.$, more preferably $65° C. \leq T_b < T_a \leq 120° C.$ If $T_b$ is lower than 25° C., spontaneous restoration at around normal temperature from the reformed shape to the original shape of the shape memory polymer resin obtained will undesirably occur markedly, for instance, during storage of the product. On the other hand, if $T_a$ exceeds 150° C., the processability of the polymer resin by means of a general purpose plastic processing machine will be lowered.

Also, if the relationship of $T_b < T_a$ is not satisfied, the shape memorizing performance cannot be sufficiently exhibited.

The relationship should be preferably $T_a - T_b > 5°$ C., more preferably $T_a - T_b > 10°$ C. If $T_b \geq T_a$, no adequate temperature control during reforming, etc., can be achieved.

Further, as for the polymer resin composition of the present invention, similarly as in the case of the polymer resin, the phase containing primarily block A of the block copolymer and the phase containing primarily block B are non-compatible with each other, and the glass transition temperature $T_a'$ of the phase containing primarily block A and the crystalline melting point $T_b'$ of the phase containing primarily block B must have the relationship of the following formula.

$$25° C. \leq T_b' < T_a' \leq 150° C.$$

Preferably, the relationship should be $40° C. \leq T_b' < T_a' \leq 130° C.$, more preferably $65° C. \leq T_b' < T_a' \leq 120° C.$ If $T_b'$ is lower than 25° C., spontaneous restoration at around normal temperature from the reformed shape to the original shape of the shape memory polymer resin composition obtained will undesirably occur markedly, for instance, during storage of the product. On the other hand, if $T_a'$ exceeds 150° C., the processability of the polymer resin composition by means of a general purpose plastic processing machine will be lowered.

Also, if the relationship of $T_b' < T_a'$ is not satisfied, the shape memorizing performance cannot be sufficiently exhibited.

The relationship should be preferably $T_a' - T_b' > 5°$ C., more preferably $T_a' - T_b' > 10°$ C. If $T_b' \geq T_a'$, no adequate temperature control during reforming, etc. can be achieved.

The transition points as defined according to the present invention, specifically glass transition temperatures $T_a$, $T_a'$ and crystalline melting points $T_b$, $T_b'$, are respectively transition points of the polymer resin or the resin composition, and in the case of the resin composition, they are not necessarily coincident with the transition points of the block copolymer itself. These transition points are measured by, for example, DSC (differential scanning calorimeter) according to ASTM D3418 under the annealing treatment conditions of 25° C., 60 minutes. The crystalline melting point is defined as the melting peak temperature (the maximum peak temperature if two or more melting peaks exist), and the glass transition temperature as the midpoint temperature of transition.

Also, unless the crystallinity of the phase containing primarily block B at around normal temperature (25° C.) is 5% by weight or more, preferably 10% by weight or more, more preferably 20% by weight or more, of the phase containing that block, the shape memorizing performance which is the purpose of the present invention cannot be sufficiently exhibited. That is, if the crystallinity is less than 5% by weight, the polymer will remarkably exhibit rubber elasticity, whereby memory of shape can be imparted with difficulty. The crystallinity is determined by the endothermic amount during crystal melting by DSC according to the method as described above.

The shape memory polymer resin or the resin composition of the present invention exhibits temperature dependency as described below in the respective temperature zones because of its structure. That is, (i) at a temperature exceeding the glass transition temperature of the phase containing primarily block A, the polymer resin is as a whole in the state of being completely melted and softened and therefore exhibits plastic flowability. Therefore, the block copolymer can be processed and molded easily by means of various general purpose plastic processing machines. (ii) In the temperature zone not higher than the glass transition temperature of the phase containing primarily block A and exceeding the crystalline melting point of the phase containing primarily block B, the phase containing block B of the polymer resin or the resin composition is in the state of the melted rubber phase as such, and the phase containing the block A is in the form of a resin to function as crosslinking points to form a network of the polymer chains of the rubber phase. For this reason, in this temperature zone the polymer resin or the resin composition exhibits properties of a crosslinked rubber, as a whole and the strain by the applied force is substantially completely retained without relaxation. (iii) At a temperature not higher than the melting point of the phase containing primarily block B, the respective phases of the polymer resin or the resin composition will be crystallized or glassified, whereby the polymer resin or the resin composition exhibits the hardened so-called resinous properties, and the strain is fixed.

The shape memory polymer resin or the resin composition of the present invention, in its performances, 1) can be compressed by at least ¼ of the original thickness according to the measuring method of compression permanent strain of JIS K6301 at a temperature of $(Ta+Tb)/2$ or $(Ta'+Tb')/2$, 2) can be non-elastically fixed in amount of at least 70% of the deformation by cooling the compressed product to 25° C. after having maintained it at the same temperature for 3 minutes, and 3) can be restored in amount of at least 90% of said deformation by reheating to a temperature exceeding $(Ta+Tb)/2$ or $(Ta'+Tb')/2$.

In other words, the resin or the resin composition having the non-destructively possible deformation width less than ¼ of the original thickness is not desirable, because unrestorable destruction of the molded product will occur markedly during reforming. Also, unless the resin or the resin composition of the present invention is fixed nonelastically in amount of at least 70% of the deformation after cooling, the remolding operation can be done with difficulty. Further, without restoration in amount of at least 90% of the deformation fixed by heating, the form collapsing of the molded shape will be undesirably conspicuous.

The block copolymer or the block copolymer component used in the shape memory polymer resin or the resin composition according to the present invention may be generally preferred to use the block copolymer as described above alone, but it may be also one containing in admixture an incomplete block copolymer containing no A-B-A block structure in the polymer chain formed during preparation of the block copolymer, for example, polymers consisting only of the block A or the block B, or A-B or B-A-B type block copolymers. However, even in this case, the shape memorizing performance intended by the present invention cannot be sufficiently exhibited, unless the block copolymer as defined in the present invention is contained in an amount of at least 30% by weight, preferably 50% by weight, more preferably 70% by weight, most preferably 90% by weight.

Further, the block copolymer or the block copolymer component used in the present invention may contain blocks other than those defined in the present invention or functional groups in the polymer chain within the range which does not impair the purpose of the present invention. In some cases, by containing these, miscibility with other polymers or fillers and various resinous properties can be improved to great extent. Examples of the blocks other than those defined in the present invention may include rubbery polymer blocks having crystallizability and a low glass transition temperature and comprising various conjugated diene polymers and hydrogenated products, and crystalline polymer blocks having a melting point exceeding the glass transition temperature Ta or Ta' of the phase containing block A selected from polyamide, polyester, polyurethane, polyether, etc. Examples of the functional group may include anionic groups such as carboxyl group, sulfonic acid group, phosphoric acid group, etc., cationic groups such as amino group, and reactive functional groups such as alcohol, phenol, epoxy group, carboxylic anhydride group, etc.

The shape memory polymer resin composition of the present invention is a composition containing, in addition to (I) the block copolymer resin component as described above, (II) a polymer component miscible with at least one of block A and block B of the block copolymer component in order to improve shape memorizing performance, softening temperature, rigidity, strength, impact strength, moldability of the resin material, etc.

Here, the term "miscible" means that mixing (compatibility) on the molecular scale of the polymers is possible, and mixing in binary, ternary or more multi-component systems may be possible. The miscible polymer depends on the structure of the block copolymer to be mixed and cannot be specified in one sense. The experimental assessing method of the miscible polymer and specific combination thereof can follow those reported by Sonja Kraus [S. Kraus, "Polymer Blends" (D. R. Paul, S. Newman ed.), Chapter 2, Academic Press, Inc. (1978)].

The assessment of at least partial miscibility of a polymer mixture can be conducted by, for example, the detection of change of glass transition temperature or melting point of the component of the mixture from that in the case of a polymer alone.

As examples of particularly preferable polymers to be mixed, there may be included various polymers having aromatic nucleus as the polymer miscible with the block A phase, for example, homopolymers such as polymers of vinyl aromatic compounds, phenylene ether polymers, etc., copolymers such as copolymers of a vinyl aromatic compound with a monomer copolymerizable therewith. Specific examples of the copolymers of a vinyl aromatic compound and a monomer copolymerizable therewith may include a random or block copolymer of styrene-conjugated diene or a hydrogenated product thereof, a styrene-acrylic acid compound copolymer, a styrene-methacrylic acid compound copolymer, a styrene-acrylonitrile copolymer and a styrene-maleic acid compound copolymer.

As the polymer miscible with the block B phase, various olefinic polymers, for example, linear low density (LLD) polyethylenes may be included.

By mixing with these polymers, the shape memory polymer resin composition of the present invention can be controlled in the melting point Ta' and the glass transition temperature Tb' as compared with the polymer resin alone, whereby shape memorizing performance, heat resistance, processing moldability, etc. of the composition can be improved.

For example, by mixing with a phenylene ether polymer, the glass transition temperature of the phase containing the block A of the polymer component (I) in the composition can be enhanced, or by mixing with a LLD polyethylene, the melting point of the phase containing block B of the polymer component (I) in the composition can be controlled.

The preferable amount of the polymer component (II) miscible with at least one of block A and block B in the block copolymer resin component (I) based on 100 parts by weight of the block copolymer resin component (I) may be 0.1 to 400 parts by weight, more preferably 1 to 100 parts by weight, particularly 5 to 50 parts by weight. When the amount being less than 0.1 part by weight outside of this range, no improved effect on performance expected of the resin composition can be recognized, while when it exceeding 400 parts by weight, the shape memorizing performance aimed at by the present invention will be undesirably lowered.

Preferable weight average molecular weight of these miscible polymers may be 500 to 1,000,000, more preferably 1,000 to 100,000, particularly 2,000 to 50,000. If the molecular weight of the miscible polymer is less than 500, rigidity or strength at normal temperature of the polymer resin obtained will be greatly lowered, while if it exceeds 1,000,000, processability will be undesirably lowered.

The shape memory polymer resin or resin composition of the present invention may further contain, in addition to the polymer resin or resin component as described above, polymers not specifically defined in the present invention, namely polymers immiscible with said block copolymer resin or resin component, if necessary, in order to control hardness or plasticity, etc. In this case its amount mixed must be not more than 400 parts by weight per 100 parts by weight of the block copolymer resin or the block copolymer component in the composition. If it exceeds 400 parts by weight, the shape memorizing performance aimed at by the present invention will be undesirably lowered.

Further, the shape memory polymer resin or resin composition of the present invention can contain inorganic fillers or plasticizers in addition to the above-described polymer components also for controlling hardness or plasticity, etc., if necessary.

The amount of inorganic filler used may be 1 to 100 parts by weight per 100 parts by weight of the polymer resin or the polymer resin component in the resin composition. Examples of inorganic filler may include titanium oxide, calcium carbonate, clay, talc, mica, bentonite, etc. Use of inorganic filler in excess of 100 parts by weight is not desirable, because shape memorizing performance or impact resistance of the shape memory resin or resin composition obtained will be lowered.

The amount of plasticizer used may be generally 1 to 20 parts by weight per 100 parts by weight of the polymer resin or the polymer resin component in the resin composition. Examples of plasticizer may include dibutyl phthalate, di-(2-ethylhexyl) phthalate, di-(2-ethylhexyl) adipate, diethylene glycol dibenzoate, butyl stearate, butylepoxy stearate, tri-(2-ethylhexyl) phosphate, etc.

Further, in the shape memory polymer resin or resin composition of the present invention additives generally added to polymer resin materials can be suitably added in the similar way to that in the resin materials of the prior art.

Suitable additives may include softening agents, plasticizers such as terpene resins, oils, etc. in amounts of 30 parts by weight or less based on 100 parts by weight of the resin or the polymer resin component in the resin composition of the present invention. Also, it is possible to use various stabilizers, pigments, anti-blocking agent or lubricants such as fatty acid amides, ethylene bisstearoamide, etc., antistatic agents such as sorbitane monostearate, saturated fatty acid esters of fatty alcohols, fatty acid esters of pentaerythritol, etc., UV-ray absorbers such as p-t-butylphenylsalicylate, 2-(2'-hydroxy-5'-methylphenyl)benzotriazole, 2-(2'-hydroxy-3'-t-butyl-5'-methylphenyl)-5-chlorobenzotriazole, 2,5-bis-[5'-t-butylbenzoxazolyl-(2)]thiophene, etc., and other compounds as described in "Practical Handbook of Additives for Plastics and Rubber" (Kagaku Kogyosha). These may be used generally in amounts ranging from 0.01 to 5 parts by weight, preferably from 0.1 to 2 parts by weight, based on 100 parts by weight of the resin or the resin component in the resin composition of the present invention.

The shape memory polymer resin or resin composition of the present invention may have a melt flow as measured according to JIS K-6970 (200° C., load 5 kg) of 0.001 to 70, preferably 0.01 to 50, more preferably 0.1 to 30 g/10 min. Particularly preferred is one having a melt flow of 0.5 to 10 g/10 min. The polymer resin or resin composition having a melt flow within such range has excellent processing moldability.

The method for mixing the respective components of the shape memory polymer resin or resin composition of the present invention may be any of all formulation methods known in the art. For example, there may be employed the melting and kneading method of using mixers in general such as an open roll, an intensive mixer, an internal mixer, a kneader, a continuous kneader equipped with biaxial rotors, and an extruder, and the method of mixing the respective components by dissolving or dispersing in a solvent and thereafter removing the solvent by heating, etc.

Also, the molded product of the shape memory resin or resin composition of the present invention (hereinafter abbreviated merely as "shape memorizing molded product") can be obtained by molding according to various types of general purpose plastic molding methods. For example, such methods as injection molding, extrusion molding, vacuum molding, compression molding, transfer molding, etc. may be employed.

The shape memorizing molded product of the present invention can be prepared according to the process as described below. That is, it can be prepared by molding said shape memory polymer resin or resin composition to a desired shape at a temperature exceeding the glass transition temperature Ta or Ta' of the phase containing the block A, preferably a temperature further higher by 20° C. or higher, reforming the molded product to a shape different from the above shape at a temperature lower than Ta or Ta', preferably lower than Ta or Ta' and not lower than the melting point Tb or Tb' of the phase containing the block B, further preferably at a temperature lower than Ta or Ta' and at which 90% or more of the crystal of the phase containing the block B at 25° C. melts, and cooling the reformed product to Tb or Tb' or lower while maintaining its shape.

If the molding temperature is lower than Ta or Ta', processing strain remains in the molded product to cause undesirably deformation of the molded product. On the other hand, if the reforming temperature exceeds Ta or Ta', restoration percentage of the molded product to the original form will be undesirably lowered to a great extent.

The shape of the shape memorizing molded product of the present invention is variable variously depending on its uses, and is not specifically defined.

The shape memorizing molded product thus obtained can be restored to the original shape in use by heating it to not lower than a temperature of Tb or Tb' and lower than the molding temperature, preferably not higher than Ta or Ta'. A restoration temperature of not lower than the molding temperature is not desirable, because lowering in shape restoration percentage or deformation of molded product may be caused thereby. Also, if the restoration temperature is lower than Tb or Tb', the restoration rate will be undesirably lowered.

The shape memorizing molded product of the present invention can be used for all uses in which shape memorizing performance can be exhibited. Specific examples of use may include toys, bonding materials for pipes having singular profile, internal laminating materials of pipes, lining materials, clamping pins, medical instrument materials such as gyps, etc., stationery and educational materials, artificial flowers, dolls, internal laminates of rolls of dotting printer for computer, soundproofing materials, members requiring deformation restoration after impact absorption such as automobile bumper, etc., gap preventing materials of partitioning members for house, portable vessels which are folded during nonuse and restored in shape during use, mechanical devices such as coupling, etc., various heat shrinkable tubes, etc.

The resin or resin composition of the present invention can be processed easily by plastic processing machines for general purpose, excellent in shape memorizing characteristic (shape restoration percentage is high, and substantially no spontaneous restoration of shape occurs), and also excellent in performances such as strength, heat resistance, weathering resistance, etc., and the shape memorizing molded product obtained therefrom is a molded product excellent in shape memorizing property and also excellent in strength, heat resistance and weathering resistance.

EXAMPLES

The present invention is described in more detail by referring to Examples, but the scope of the present invention is not limited to these.

The analytical methods and the methods for evaluation of physical properties are as follows.

Analytical methods (a) The content by weight of the block copolymer and its molecular weight are determined by the peak processing of the data measured by GPC.

(b) Weight fraction of the block A is determined by processing of the data measured by IR spectophotometer of the polymer before hydrogenation.

(c) Weight average molecular weights of block A and block B are determined from the data measured by GPC and the data of a polymer composition.

(d) The glass transition temperature, crystallinity and a crystalline melting point are determined by differential scanning calorimeter (DSC). When the crystalline melting point of the hydrogenated block copolymer overlaps the glass transition temperature, the glass transition temperature of the hydrogenated block copolymer is substituted with the value measured as the glass transition temperature of the unhydrogenated block copolymer.

(e) The 1,4-linkage content of the butadiene portion is determined by processing of the data by IR spectrophotometer of the block copolymer before hydrogenation.

(f) Hydrogenation percentage is analyzed by proton NMR.

Methods for evaluation of the physical properties (a) Melt index is measured according to ASTM D 1238-57T under the condition G.

(b) Hardness is measured by Shore Durometer D at 25° C. according to ASTM D 1484-59T.

(c) Strength at break and elongation at break are measured, after preparing a molded product shaped in sheet by an injection molding machine at a temperature of 230° C. and a mold temperature of 40° C., according to JIS K-7113 by using a No. 2 type test strip at the tensile speed G.

(d) Shape memory evaluation [see FIG. 1]
1) Molding

A molded product is obtained by compression molding at 200° C. for 10 minutes and annealing. Its thickness is defined as $L_0$, and the diameter of a cylinder as $D_0$. $L_0 = 12.7$ mm, $D_0 = 29.0$ mm.

2) Reforming

The molded product is heated to a temperature of $(Ta+Tb)/2$ or $(Ta'+Tb')/2$, and then compressed by ¼-fold thickness, and after maintaining it for 3 minutes cooled to 25° C., and the pressure is released, thereby obtaining a shape memorizing reformed product. Its thickness is defined as $L_1$.

3) Restoration by heating

Restoration by heating is performed at a temperature of $(Ta+Tb)/2 + 10°$ C. or $(Ta'+Tb')/2 + 10°$ C. for 5 minutes. Its thickness is defined as $L_2$.

Reformation fixing percentage = $[(L_0-L_1)/1/4L_0] \times 100$

Heating restoration percentage = $[(L_2-L_1)/(L_0-L_1)] \times 100$ (e) Heat resistance is measured by the air heating aging test method according to JIS K6301.

Test conditions: inner tank temperature 70° C., test time 96 hours (f) Weathering resistance is measured by Sunshine Weather-o-meter.

Test conditions: black panel temperature 43° C., spray cycle 60 minutes period, 12 minutes rain fall, test time 100 hours (g) Injection moldability is judged, after preparing a molded product shaped in sheet set at an injection molding machine temperature of 230° C. and a mold temperature of 40° C., from the surface state and dimensional stability of the molded product.

EXAMPLE 1 TO 9 AND COMPARATIVE EXAMPLES 1 TO 4

First, processes for preparing the block copolymers used are described.

(1) The polymers of Examples 1 to 5 were obtained by successively polymerizing the respective blocks at a polymerization temperature of 70° C. for 3 hours by anionic polymerization of a monomer mixture of α-methylstyrene and styrene, 1,3-butadiene and again a monomer mixture of α-methylstyrene and styrene in cyclohexane as the solvent with a necessary amount of n-butyllithium to obtain a block copolymer, and subsequently charging a cyclohexane solution containing 1 mmol of bis(cyclopentadieneyl)titanium dichloride as the catalyst component (A) and 4 mmol of butyllithium as the catalyst component (B) per 1000 g of the polymer and feeding hydrogen at 50° C. under 5 kg/cm² to carry out the reaction for 2 hours, thereby effecting hydrogenation reaction to the unsaturated bonds of the olefinic portions of the polymer to obtain a linear block copolymer of an A-B-A structure.

(2) The polymer of Example 6 was prepared by carrying out the reaction under the same conditions except for using 1,1-diphenylethylene in place of α-methylstyrene.

(3) The polymer of Example 7 was prepared by polymerizing successively a monomer mixture of α-methylstyrene and styrene, 1,3-butadiene by anionic polymerization with butyllithium in cyclohexane as the solvent, followed by coupling reaction of the terminal ends with diphenyl carbonate, and carrying out hydrogenation reaction to the unsaturated bonds at the olefinic portions of the polymer obtained to give a radial block copolymer having a (A-B)₃X structure.

(4) The polymer of Example 8 was prepared by polymerizing a monomer mixture of styrene and butadiene by anionic polymerization with butyllithium in cyclohexane as the solvent, then polymerizing again a monomer mixture of styrene and butadiene and carrying out a hydrogenation reaction onto the unsaturated bonds of the olefinic portions of the polymer obtained, to give a linear type block copolymer with a B-A-B-A structure having a tapered copolymer structure.

(5) The polymer of Example 9 was prepared by anionic polymerization of a polystyrene macromer having aromatic vinyl groups at one terminal of the polymer chain and a conjugated diene type monomer mixture comprising 2% by weight of isoprene and 98% by weight of 1,3-butadiene with butyllithium by using barium-di-tert-butoxide as the co-catalyst in cyclohexane as the solvent, and carrying out a hydrogenation reaction to the unsaturated bonds of the olefinic portions of the polymer obtained, to give a graft type block copolymer having a structure of:

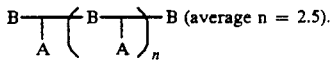

(6) The polymer of Comparative Example 1 was prepared in the same manner as in Examples 1 to 3 except for using a solvent mixture of cyclohexane and tetrahydrofuran, to give a non-crystalline linear type block copolymer corresponding to the A-B-A structure.

(7) The polymer of Comparative Example 2 was prepared in the same manner as in Examples 1 to 3 except for changing the polymerization order of the monomers to 1,3-butadiene, a monomer mixture of α-methylstyrene and styrene, and 1,3-butadiene to obtain a linear type block copolymer of a B-A-B structure.

(8) The polymer of Comparative Example 3 was prepared by polymerizing successively styrene, butadiene according to the process disclosed in Japanese Unexamined Patent Publication No. 215616/1987 by using a complex catalyst comprising barium dinonylphenoxide as the catalyst component (A), butyllithium as the catalyst component (B), dibutylmagnesium as the catalyst component (C) and triethylaluminum as the catalyst component (D), and then charging ethyl acetate to carry out the coupling reaction.

The polymer of Comparative Example 4 was obtained by carrying out a hydrogenation reaction similarly as in Examples 1 to 5 to the unsaturated bonds of the polymer obtained by the same process.

The structures and the characteristics of the block copolymers obtained above are shown in Table 1.

Further, general resin properties, shape memorizing performance and processability of the shape memory polymer resin comprising 100 parts by weight of each copolymer, 1 part by weight of BHT (2,5-di-tert-butyl-hydroxy-p-toluene) and 0.5 part by weight of TNP (trinonylphenylphosphate) in the form of compression molded sheet were evaluated. The evaluation results are shown in Table 2.

TABLE I

| | | Block copolymer | | Block A | | | Block B | | | | |
|---|---|---|---|---|---|---|---|---|---|---|---|
| Example or Comparative Example | Block structure | Content by weight (%) | Weight average molecular weight (×10⁴) | Weight fraction of block A (%) | Weight average molecular weight (×10⁴) | Glass transition temperature (°C.) | Content of 1,4-linkage (%) | Hydrogenation ratio (mole %) | Weight average molecular weight (×10⁴) | Crystallinity (wt %) | Crystalline melting point (°C.) |
| Example 1 | A—B—A | 97 | 3.1 | 40 | 0.62 | 110 | 88 | 99 | 1.9 | 29 | 93 |
| 2 | " | 96 | 4.4 | 28 | 0.61 | 110 | 88 | 100 | 3.2 | 31 | 95 |
| 3 | " | 94 | 10.3 | 16 | 0.82 | 115 | 88 | 100 | 8.7 | 32 | 96 |
| 4 | " | 95 | 5.2 | 30 | 0.78 | 110 | 90 | 99 | 3.6 | 32 | 97 |
| 5 | " | 93 | 5.7 | 28 | 0.80 | 113 | 83 | 98 | 4.1 | 12 | 75 |
| 6 | " | 90 | 5.5 | 30 | 0.83 | 135 | 88 | 99 | 3.9 | 28 | 91 |
| 7 | (A—B)₃X | 91 | 4.4 | 31 | 0.46 | 105 | 88 | 99 | 1.1 | 31 | 94 |
| 8 | A—B—A—B | 92 | 4.8 | 30 | 0.72 | 105 | 88 | 99 | 1.7 | 30 | 94 |
| 9 | B-[B-(A)-]₂.₅-B | 70 | 8.2 | 29 | 0.68 | 98 | 85 | 98 | 1.3 | 21 | 74 |
| Comp. Ex. 1 | A—B—A | 95 | 4.7 | 30 | 0.70 | 110 | 58 | 100 | 3.3 | 0 | Non-crystallinity |
| 2 | B—A—B | 95 | 4.7 | 28 | 1.40 | 105 | 88 | 100 | 1.7 | 33 | 96 |
| 3 | A—B—A | 93 | 7.1 | 29 | 1.03 | 96 | 96 | 0 | 5.0 | 34 | 89 |

TABLE 1-continued

Structures and characteristics of respective blocks of polymers

| Example or Comparative Example | Block structure | Block copolymer | | Block A | | | Block B | | | | |
|---|---|---|---|---|---|---|---|---|---|---|---|
| | | Content by weight (%) | Weight average molecular weight (×10⁴) | Weight fraction of block A (%) | Weight average molecular weight (×10⁴) | Glass transition temperature (°C.) | Content of 1,4-linkage (%) | Hydrogenation ratio (mole %) | Weight average molecular weight (x10⁴) | Crystallinity (wt %) | Crystalline melting point (°C.) |
| 4 | A—B—A | 94 | 5.4 | 29 | 0.78 | 98 | 96 | 99 | 3.8 | 55 | 120 |

TABLE 2

| Example or Comparative example | Melt index | General resin properties | | | Shape memorizing performance | | Heat resistance and Weathering resistance | | Injection moldability |
|---|---|---|---|---|---|---|---|---|---|
| | | Hardness | Strength at break (Kg/cm²) | Elongation at break (%) | Reformation fixing ratio (%) | Restoration ratio (%) | Heat resistant strength retention ratio (%) | Weathering resistant strength retention ratio (%) | |
| Example 1 | 31 | 57 | 160 | 600 | 95 | 90 | 109 | 101 | Good |
| 2 | 7.7 | 61 | 350 | 600 | 94 | 97 | 105 | 98 | Excellent |
| 3 | 0.1 | 63 | 410 | 550 | 93 | 100 | 100 | 96 | Good |
| 4 | 3.7 | 61 | 350 | 550 | 98 | 98 | 105 | 96 | Excellent |
| 5 | 2.9 | 42 | 310 | 650 | 79 | 97 | 102 | 95 | Excellent |
| 6 | 4.3 | 63 | 360 | 550 | 93 | 99 | 105 | 98 | Good |
| 7 | 4.8 | 62 | 330 | 550 | 94 | 98 | 104 | 96 | Good |
| 8 | 8.2 | 60 | 270 | 500 | 94 | 94 | 105 | 97 | Excellent |
| 9 | 0.6 | 60 | 280 | 450 | 93 | 98 | 103 | 95 | Good |
| Comp. Ex. 1 | 7.2 | 18 | 250 | 600 | 29 | * | 101 | 98 | Good |
| 2 | 6.5 | 59 | 120 | 180 | 93 | 35 | — | — | Good |
| 3 | 4.6 | 60 | 220 | 650 | 94 | 98 | 75 | 45 | Good |
| 4 | 3.5 | 71 | 350 | 400 | ** | ** | 104 | 97 | Slightly inferior |

Note:
*Shape cannot be fixed and measurement is impossible because of having rubbery elasticity at room temperature.
**Molded product is broken by compression during reforming.

EXAMPLES 10 TO 14

Block copolymers and the polymers miscible therewith were kneaded in laboplastomill at 200° C. and the shape memory polymer resin compositions obtained were evaluated similarly as in Examples 1 to 9.

The compositions of the polymer resin compositions and the transition temperatures of the respective block phases are shown in Table 3.

Further, the evaluation results of the general resin properties and the shape memorizing performances of the shape memory polymer resin composition comprising 100 parts by weight of the polymer, 1 part by weight of BHT and 0.5 part by weight of TNP in the form of compression molded sheet are shown in Table 4.

TABLE 3

| Example | Composition (parts by weight) | | | | Ta' of phase containing block A (°C.) | Tb' of phase containing block B (°C.) |
|---|---|---|---|---|---|---|
| | Block*¹ copolymer | Polyphenylene*² ether | Poly-α-*³ methylstyrene | Polyethylene*⁴ | | |
| Example 10 | 100 | 5 | 0 | 0 | 114 | 97 |
| 11 | 100 | 20 | 0 | 0 | 139 | 97 |
| 12 | 100 | 0 | 20 | 0 | 113 | 96 |
| 13 | 100 | 0 | 0 | 20 | 110 | 100 |
| 14 | 100 | 0 | 20 | 50 | 137 | 105 |

Note:
*¹Polymer obtained in Example 4.
*²Polyphenylene ether resin (weight average molecular weight 18,000).
*³Crystalex 1120, available from Rika Hercules K.K.
*⁴L.LDPE [density 0.92, M.P. 116° C., M.I. (according to the method of JIS K 6760) 1.2 g/10 min.]

TABLE 4

| Example | General resin properties | | | Shape memorizing performance | | Heat resistance and Weathering resistance | | Injection moldability |
|---|---|---|---|---|---|---|---|---|
| | Hardness | Strength at break (Kg/cm²) | Elongation at break (%) | Reformation fixing ratio (%) | Restoration ratio (%) | Heat resistant strength retention ratio (%) | Weathering resistant strength retention ratio (%) | |
| Example 10 | 62 | 320 | 500 | 98 | 98 | 103 | 98 | Excellent |
| 11 | 70 | 290 | 480 | 98 | 98 | 100 | 100 | Excellent |
| 12 | 67 | 280 | 460 | 97 | 96 | 109 | 96 | Excellent |
| 13 | 60 | 260 | 490 | 96 | 97 | 102 | 95 | Good |
| 14 | 57 | 180 | 410 | 94 | 92 | 98 | 94 | Good |

EXAMPLE 15

A shape memory polymer resin comprising a block copolymer alone obtained in the same conditions as in Example 2 was extrusion molded at 200° C. by using Brabender Plastograph (manufactured by Brabender Instruments Co.) into a tubular shape having an inner diameter of 8 mmφ and a thickness of 0.5 mm.

Then, the tube was again heated to 100° C. and expanded by application of external force so that the inner diameter became 16 mmφ, and cooled as such to a room temperature to fix the reformed shape, whereby a tubular shape memorizing molded product having an inner diameter of 16 mmφ which memorized the tubular shape having an inner diameter of 8 mmφ, was obtained.

Figure 2:
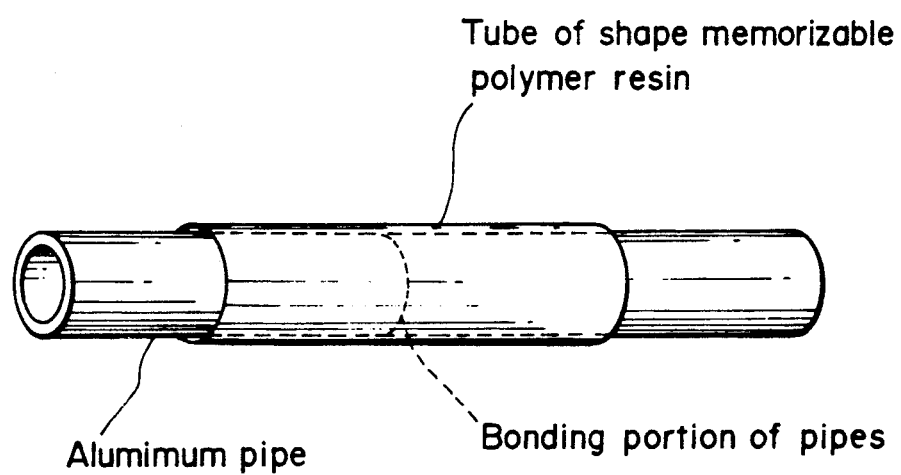
FIG. 2 illustrates an application example of the shape memory polymer resin.

This was covered at the bonding portion between the two aluminum pipes having an outer diameter of 13 mmφ as shown in FIG. 2, and the memorizing shape was restored by heating it to 100° C. to bond by coating the bonding portion. The bonding portion of the two pipes was found to be adhered and fixedly bonded with high strength.

We claim:

1. A shape memory polymer resin, consisting essentially of a block copolymer having an A-B-A block structure in the polymer chain, and having a weight average molecular weight within the range of 10,000 to 1,000,000, wherein
   (a) block A is a polymer block comprising a homopolymer of a vinyl aromatic compound, a copolymer of a vinyl aromatic compound and another vinyl aromatic compound, a copolymer of a vinyl aromatic compound and a conjugated diene compound, and/or a hydrogenated product thereof;
   (b) block B is a polymer block comprising a homopolymer of butadiene, a copolymer of butadiene with another conjugated diene compound, a copolymer of butadiene with a vinyl aromatic compound, and/or a hydrogenated product thereof, the content of butadiene and/or the hydrogenated product thereof in block B being at least 80% by weight, and 80 to 91% of the linkages of the butadiene and/or the hydrogenated product thereof being 1,4-linkages;
   (c) at least 80% by weight of the conjugated diene in the block copolymer being hydrogenated; and
   (d) the block copolymer comprises 5 to 50% by weight of said block A; and
wherein said polymer resin having the following properties (1) to (3):
   (1) the glass transition temperature Ta of the phase containing block A and the crystalline melting point Tb of the phase containing block B, having the relationship shown by the following formula:

$$25°\ C. \leqq Tb < Ta \leqq 150°\ C.,$$

(2) the crystallinity of the phase containing block B at 25° C. being at least 5% by weight; and
   (3) said polymer resin being compressible by at least ⅓-fold of the original thickness at a temperature of (Ta+Tb)/2, and at least 70% of the deformation being fixed by cooling the compressed product to 25° C., and at least 90% of said deformation fixed being restored by reheating to a temperature exceeding (Ta+Tb)/2.

2. The shape memory polymer resin according to claim 1, wherein the block copolymer has a linear type block structure, a radial type block structure or a graft type block structure represented by the formulae:
   (a) $(A-B)_nA$
   (b) $B(A-B)_nA$
   (c) $B(A-B)_nA-B$
   (d) $[(A-B)_n]_mX$
   (e) $[(A-B)_nA]_mX$
   (f) $[B(A-B)_n]_mX$
   (g) $[B(A-B)_nA]_mX$

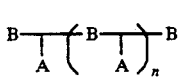
(h)

wherein n is an integer of 1 to 10, m is an integer of 2 to 10, and X is a terminal coupling agent.

3. The shape memory polymer resin according to claim 1, wherein the weight average molecular weight (Mw) of the total block copolymer is within the range of 15,000 to 300,000.

4. The shape memory polymer resin according to claim 1, wherein the content of the vinyl aromatic compound or its hydrogenated product in block A is at least 70% by weight.

5. The shape memory polymer resin according to claim 1, wherein the content of butadiene or a hydrogenated product thereof in block B is at least 95% by weight.

6. The shape memory polymer resin according to claim 1, wherein the content of the 1,4-linkage in the linkage of butadiene in block B is within the range of 83 to 90%.

7. The shape memory polymer resin according to claim 1, wherein at least 90 mole % of the conjugated diene in block B is hydrogenated.

8. The shape memory polymer resin according to claim 1, wherein at least 95 mole % of the conjugated diene in block B is hydrogenated.

9. The shape memory polymer resin according to claim 1, wherein the vinyl aromatic compound in the block copolymer is styrene and/or α-methylstyrene.

10. The shape memory polymer resin according to claim 1, wherein the glass transition temperature Ta of the phase containing block A and the crystalline melting point Tb of the phase containing block B has the relationship of the following formula:

$$40°\ C. \leqq Tb < Ta \leqq 130°\ C.$$

11. The shape memory polymer resin according to claim 1, wherein the glass transition temperature Ta of the phase containing block A and the crystal melting point Tb of the phase containing block B has the relationship of the following formula:

$$Ta-Tb > 5°\ C.$$

12. The shape memory polymer resin according to claim 1, wherein the crystallinity of the phase containing block B at 25° C. is at least 10% by weight.

13. The shape memory polymer resin according to claim 1, further comprising 1 to 100 parts of an inorganic filler based on 100 parts by weight of said shape memory polymer resin.

* * * * *